May 10, 1955  L. W. JOHNSON  2,707,986
RESILIENT SUPPORT FOR TRACTOR SEAT
Filed March 19, 1953

Inventor
Leslie W Johnson
By Arthur H. Sturges
Attorney

2,707,986
RESILIENT SUPPORT FOR TRACTOR SEAT

Leslie W. Johnson, Minden, Nebr.

Application March 19, 1953, Serial No. 343,409

4 Claims. (Cl. 155—9)

This invention relates to seat supports particularly of the resilient or yielding type as used on tractors and farm implements and equipment, and in particular a seat carried by an arm mounted on a tractor with a ball and socket joint and resiliently held by compression springs and also with telescoping compression cylinders connecting the sides of the seat to upwardly inclined arms of a bracket mounted on the tractor.

The purpose of this invention is to relieve the shock resulting from rigid mountings of seats on tractors and farm equipment by combining a ball and socket connection with both pressure springs and cylinders whereby a floating mounting is provided.

Various types of hydraulic and pneumatic cylinders and also different arrangements of springs have been incorporated in seat mountings for seats on tractors and other farm equipment to relieve shocks and jars caused by rigid seat supports; however, because tractors and other vehicles of this type travel on uneven ground such devices have not been found successful.

With this thought in mind this invention contemplates a seat mounting wherein the seat swings laterally about a ball and socket connection and movement of the seat is restricted by combinations of springs and cushioning telescoping cylinders extended angularly from both sides of the seat.

The object of this invention is, therefore, to provide an improved seat mounting wherein the seat swings from a common point and movement thereof is controlled by springs and air cushioning elements.

Another object of the invention is to provide a flexible seat mounting wherein resilient forces for urging the seat to a neutral position are adjustable.

Another important object of the invention is to provide a resilient seat mounting that is adapted to be installed on tractors and other vehicles now in use.

A further object of the invention is to provide an improved resilient seat mounting wherein compression springs and air cushioning devices urge the seat to the position of the conventional seat of the vehicle.

A still further object of the invention is to provide a floating or flexible seat mounting for tractor seats in which the mounting is of a simple and economical construction.

With these and other objects and advantages in view the invention embodies a bracket having a ball extended upwardly therefrom, a seat having an arm with a socket in the extended end positioned with the socket on the ball of the bracket, compression springs connecting sides of the seat to upwardly inclined arms of an outrigging or angle bar, and telescoping cylinders having air cushions therein also positioned between sides of the seat and upwardly inclined arms.

Other features and advantages of the invention will appear from the following description taken in connection with the drawing, wherein.

Figures 1, 2, 3, 4:
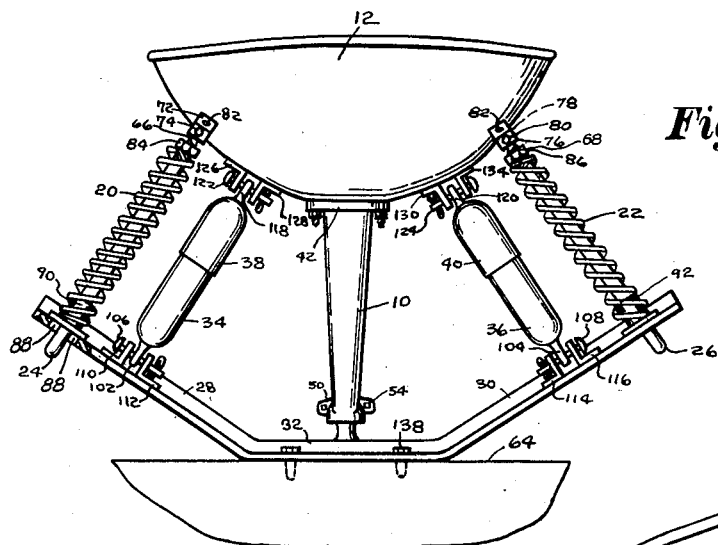
Figure 1 is a rear elevational view illustrating the improved seat mounting and showing the parts installed on a tractor, the main portion of which is broken away.
Figure 2 is a side elevational view also showing the seat mounted on a tractor, and also having the main portion of the tractor broken away.
Figure 3 is a detail showing the construction and mounting of one of the air cushioning cylinders, with parts of the cylinders broken away to show the interior structures thereof, and with the parts shown on an enlarged scale.
Figure 4 is a detail, also with the parts shown on an enlarged scale, showing the bracket with the ball thereon, and showing the end of the arm of the seat with a socket thereof positioned over the ball, and with part of the arm broken away.

Referring now to the drawing wherein like reference characters denote corresponding parts the resilient tractor seat support of this invention includes an arcuate arm 10 extended from a seat 12, a bracket 14 having a ball 16 extended upwardly therefrom and over which a socket 18 at the end of the arm 10 is positioned, springs 20 and 22 positioned around rods 24 and 26, respectively, and connecting sides of the seat 12 to upwardly inclined arms 28 and 30 of an angle iron or transversely disposed bar having a base section 32, and telescoping cylinders having lower sections 34 and 36 and upper sections 38 and 40 also connecting sides of the seat to the upwardly inclined arms 28 and 30, respectively.

The upper end of the arm 10 is provided with flanges 42, and, as shown in Figure 2, bolts 44 with heads in counter-sunk openings 46 in the bottom of the seat, and with nuts 48 on the lower ends, secure the arm to the seat 12. The lower end of the arm is provided with flanges 50 to which a complementary section 52 of the socket 18 is secured with bolts 54 extended through the flanges 50 and also through flanges 56 of the section 52. The flanges of the arm and section 52 are clamped against heads of the bolts with nuts 58, as shown in Figure 4.

The bracket 14 is provided with a base 60 through which cap screws 62 extend for mounting the bracket and ball on a tractor, as indicated by the numeral 64.

The upper ends of the rods 24 and 26 are threaded and tongues 66 and 68, which extend from the rods beyond the threads are positioned between clip angles and the tongue 66 of the rod 24 is pivotally connected to angles 70 and 72 with a pin 74. In the same manner the tongue 68 of the rod 26 is pivotally connected to angles 76 and 78 with a pin 80. The clip angles are secured to the seat 12 with bolts, as indicated by the numeral 82.

Nuts 84 and 86 are threaded on the rods and with the nuts positioned in engagement with the upper ends of the springs 20 and 22 the tension or compression of the springs may readily be adjusted. The lower ends of the rods extend through openings 88 in the arms 28 and 30, and sleeves 90 and 92 extend upwardly from the arms to provide guides for the rods.

The telescoping cylinders having the lower sections 34 and 36, and upper sections 38 and 40, are shown in detail in Figure 3, and it will be noted that the outer surfaces of the lower sections are provided with annular recesses 98 in which a ring 100 of leather or the like is positioned to provide a seal between the sections whereby should an extreme shock load compress one of the springs to such an extent that an operator on the seat may be thrown from the seat the air compressed in the cylinder adjacent the spring will check the compressing movement of the spring. By the same means a sudden return of the seat from a position in which the spring is compressed, is prevented as upon extending the length of a cylinder vacuum is created therein and the extending movement is retarded.

The closed ends of the lower sections 34 and 36 of the cylinders are provided with tangs 102 and 104, the tang 102 being pivotally connected by a pin 106 to clip angles 110 and 112 on the arm 28, and the tang 104 being similarly connected by a pin 108 to clip angles 114 and 116 on the arm 30. Similar tangs are provided on the closed ends of the upper sections 38 and 40 with a tang 118 pivotally connected by a pin 122 to clip angles 126 and 128 on one side of the seat, and a tang 120 of the section 40 similarly connected by a pin 124 to clip angles 130 and 134 on the opposite side of the seat. The pins are secured in their respective positions with cotter pins, as indicated by the numeral 136.

The base 32 of the angle iron or bar on which the upwardly inclined arms 28 and 30 are positioned is secured to the tractor or housing thereof with cap screws 138.

With the parts assembled in this manner maximum flexibility is provided in a tractor seat mounting as the seat is free to swing about the center of the ball 16 with the seat moving laterally and vertically at the same time, and with both downward and upward movements of the seat cushioned by the combinations of the springs and telescoping cylinders.

From the foregoing description it is thought to be obvious that a resilient support for a tractor seat constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A seat support comprising an arm having a socket in one end and means for attaching the opposite end to a seat, a bracket having a ball thereon positioned with the ball in the socket of said arm, a bar having upwardly extended sections extended from the ends, resilient elements extended upwardly from ends of the bar and positioned to be attached to a seat, and substantially sealed fluid cushioning cylinders also mounted on the ends of the bar and adapted to be connected to a seat, said cylinders being spaced inwardly from the resilient elements and positioned to coact with the resilient elements for retarding contracting and expanding actions of said elements the mounting of the cylinders on the bar and seat being pivotal and the axes of the pivotal mounting elements being positioned transversely of the seat, the elements for attaching the resilient elements to the seat also having pivotal elements therein and the axes of the pivotal elements of the resilient elements being positioned longitudinally of the seat.

2. In a floating seat assembly, the combination which comprises a seat, an arm attached to the bottom of the seat and extended forwardly therefrom, said arm having a ball receiving socket at the forward end and said socket being spaced forwardly from the forward edge of the seat, a bracket having a ball extended therefrom positioned with the ball in the socket of the arm, a bar having upwardly extended ends positioned transversely of the seat, rods pivotally connected to sides of the seat and extended through the ends of the bar, springs positioned around the rods and upon which the seat rests, and sealed telescoping cylinders pivotally connected to the sides of the seat and ends of the bar for coacting with the springs to control the flexibility of the seat, said cylinders being spaced inwardly from the rods on which the springs are positioned and the axes of the pivotal connections of the cylinders being positioned transversely of the seat and the axes of the pivotal connections of the rods being positioned longitudinally of the seat.

3. In a floating seat assembly, the combination which comprises a seat, an arm extended forwardly from the seat and having a ball receiving socket at the forward end said socket being positioned forwardly from the forward edge of the seat, a bracket having a ball extended upwardly therefrom and positioned with the ball in the socket of the arm, a bar positioned transversely of the seat, said bar having upwardly inclined ends and said ends having openings therethrough, rods having threaded sections thereon pivotally connected to sides of the seat and extended through the openings in the ends of the bar, nuts threaded on said rods, springs around the rods and positioned between the nuts and ends of the bar providing resilient supports for the seat, and sealed air cushioning cylinders coacting with the springs and also positioned between and pivotally connected to the sides of the seat and upwardly inclined ends of said bar, the axes of the pivotal connections of the cylinders being positioned transversely of the seat and the axes of the pivotal connections of the rods being positioned longitudinally of the seat.

4. In a seat assembly for use on a tractor, the combination which comprises an arm having an arcuate rear portion positioned with the rear portion extended upwardly, a seat carried by the arcuate rear portion of the arm, said arm having a ball receiving socket in the forward end and said socket being spaced forwardly from the forward edge of the seat, a bracket having a ball extended upwardly therefrom and adapted to be mounted on a tractor with the ball positioned in the socket of the arm extended from said seat, a transversely disposed bar having upwardly inclined arms extended from the ends adapted to be mounted on a tractor and adapted to be positioned in a plane spaced rearwardly from the point at which the arcuate rear portion of the seat mounting arm is attached to the seat, pairs of spaced clip angles secured to the bottom of the seat and spaced laterally from the longitudinal center thereof, pairs of spaced clip angles secured to the upwardly inclined arms of the transversely disposed bar, the clip angles of the bar being spaced a greater distance from the longitudinal center of the seat than the clip angles on the seat, pins extended through the clip angles of the seat and bar, said clip angles of the seat and bar being positioned whereby the axes of the pins thereof are in a transversely disposed plane in which the bar is also positioned, telescoping cylinders having closed extended ends mounted on the pins of the clip angles, spaced clip angles mounted on the seat and spaced outwardly from the clip angles to which the cylinders are attached, rods having eyes pivotally mounted by pins between the clip angles spaced outwardly from the clip angles to which the cylinders are attached and said pins of the rods being positioned with the axes thereof longitudinally disposed in relation to the seat, the lower ends of the rods being positioned in openings in the upwardly inclined arms of the transversely disposed bar, and compression springs extended around the rods and positioned between the seat and upwardly inclined arms of the bar, said rods and springs being spaced outwardly from the telescoping cylinders.

References Cited in the file of this patent
UNITED STATES PATENTS

| | | |
|---|---|---|
| 1,229,488 | Lindskoog | June 12, 1917 |
| 1,663,112 | Caslow | Mar. 20, 1928 |
| 1,711,085 | D'Arcy | Apr. 30, 1929 |
| 2,284,352 | Zank | May 26, 1942 |
| 2,489,981 | Rose | Nov. 29, 1949 |
| 2,558,928 | Byran | July 3, 1951 |